Oct. 8, 1968   R. E. D. BURROW   3,404,497
PRE-STRESSED CONCRETE PRESSURE VESSEL FOR HOUSING
NUCLEAR REACTOR, AND METHOD OF MAKING SAME
Filed July 22, 1965   2 Sheets-Sheet 1
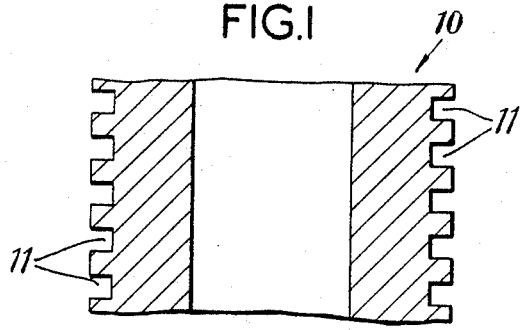
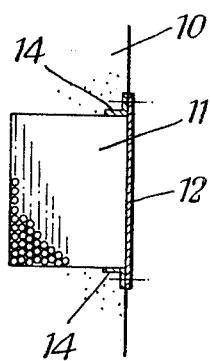 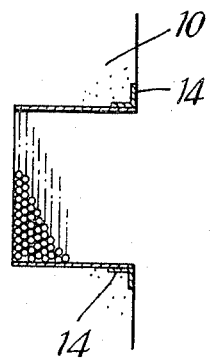
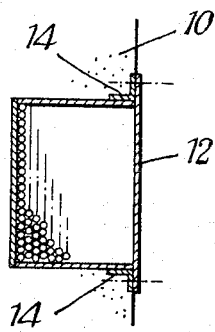

Oct. 8, 1968 R. E. D. BURROW 3,404,497
PRE-STRESSED CONCRETE PRESSURE VESSEL FOR HOUSING
NUCLEAR REACTOR, AND METHOD OF MAKING SAME
Filed July 22, 1965 2 Sheets-Sheet 2
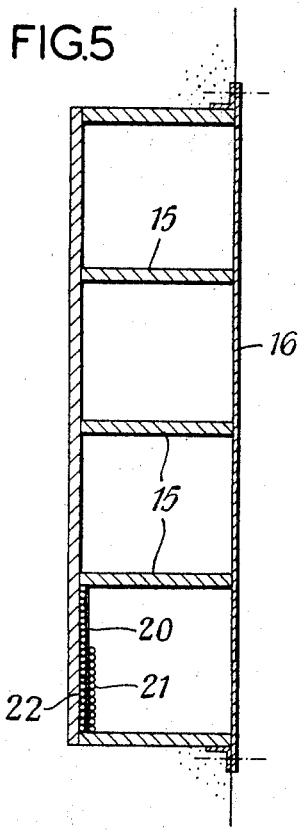
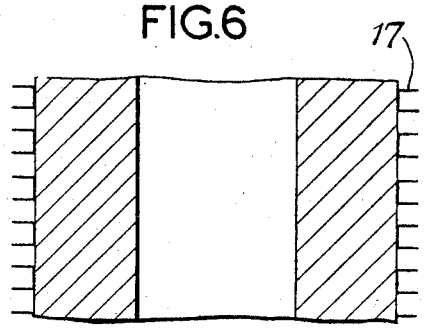
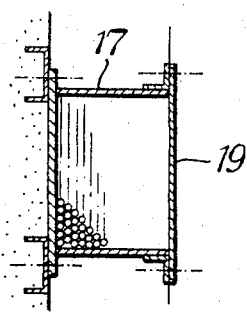
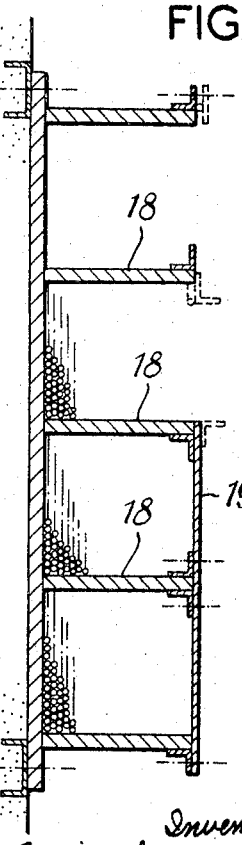
Inventor:
Reginald Edwin Downton Burrow
BY Baldwin & Wight
Attorneys

United States Patent Office 3,404,497
Patented Oct. 8, 1968

1

3,404,497
PRE-STRESSED CONCRETE PRESSURE VESSEL FOR HOUSING NUCLEAR REACTOR, AND METHOD OF MAKING SAME
Reginald Edwin Downton Burrow, Southall, England, assignor to Taylor Woodrow Construction Limited, Southall, England, a British company
Filed July 22, 1965, Ser. No. 474,116
Claims priority, application Great Britain, July 27, 1964, 29,935/64
10 Claims. (Cl. 52—224)

ABSTRACT OF THE DISCLOSURE

A pre-stressed concrete pressure vessel construction for housing a nuclear reactor includes a concrete vessel body having on its exterior at least one surrounding continuous channel, which may be formed in the body itself or may be applied to the body. A plurality of layers of tendons, e.g. wire or the like, are wound under tension within the channel or channels, and the tendons of each layer are anchored to the side walls of the associated channel. The innermost layer is supported on the channel bottom and each successive layer is supported on the adjacent layer underneath. A membrane may be positioned between adjacent layers. The channels may be lined, e.g. with metal.

This invention is concerned primarily with the circumferential stressing of concrete pressure vessels such as may be employed in nuclear power stations.

Broadly in accordance with the invention it is proposed to employ means whereby it will be possible to wind prestressing wires under tension around such a pressure vessel without the possibility of subsequent collapse of the completed band or coils due to the underlayer or layers being wedged apart by succeeding layers. Possibly channels or troughs may be provided in or on the outer surface of a pressure vessel to extend therearound, each such channel or trough being adapted to accommodate and to locate a plurality of layers of prestressing wires. The prestressing wires may be of round or circular section such as have hitherto normally been employed or they may be of rectangular or substantially rectangular section or of a tape like form in which two latter cases it may be feasible to omit the provision of the channels or troughs above referred to.

In accordance with a further aspect of the invention it is proposed to provide in or on the external surface of a concrete pressure vessel a plurality of channels, troughs or the like which extend around the circumference of the vessel and are adapted to house or accommodate and also to locate a plurality of layers of prestressing wires wound under tension around such vessel.

In accordance with yet a further aspect of the invention a method of prestressing a concrete pressure vessel will consist in winding a plurality of layers of prestressing wires under tension directly on top of each other in channels, troughs or the like which extend around the circumference of such vessel. The channels, troughs or the like may be preformed in the outer surface of the pressure vessel in which case they may or may not be lined with steel or other appropriate material or alternatively ducts or channels of steel or other appropriate material may be positioned on the outer surface of the vessel to extend around the latter.

In order that the said invention may be clearly understood and readily carried into effect reference will now be made to the accompanying diagrammatic drawings in which:

FIGURE 1 is a sectional view of a part of a concrete

2 vessel which is formed around its exterior with troughs or channels for the reception of prestressing wires, FIGURES 2, 3 and 4 illustrate three possible forms of the troughs or channels, FIGURE 5 illustrates a possible modification of the construction illustrated in FIGURE 1, FIGURE 6 is a view similar to that of FIGURE 1 but illustrating the employment of trough or channel units which are applied to the outer surface of the vessel, FIGURES 7 and 8 illustrate two forms of trough or channel unit which may be employed in the construction illustrated in FIGURE 6.

In FIGURE 1 there is shown a part of a concrete pressure vessel body of generally cylindrical form but it is to be noted here that the actual shape of the vessel body is immaterial to the invention and that such vessel body may be of stepped or any other shape depending upon design requirements. In the construction of the vessel, which is designated generally by 10, a plurality of open topped troughs or channels 11 are formed in the outer surface of the body, such troughs or channels, which are intended to accommodate layers of prestressing wires, extending in parallel relationship completely around the circumference of the vessel. The troughs or channels 11 may be of rectangular or substantially rectangular shape in cross-section as shown in the drawings or they may be of inwardly tapering shape. Said troughs or channels may be unlined as indicated in FIGURE 2 or partially or wholly lined as indicated in FIGURES 3 and 4 respectively. In those cases where the troughs or channels 11 are partially or wholly lined in the lining material employed may be steel or other appropriate material such as a plastic or possibly pre-cast concrete units and it may be desirable to provide the lining elements employed with stiffening ribs, flanges or other similar means which will stiffen or reinforce the same and/or facilitate keying thereof to the concrete structure. Preferably each trough or channel 11 will be provided with a lid or closure strip such as is indicated at 12 in FIGURES 2 and 4, such lid or closure strip being capable of being secured in place after the required prestressing wires have been wound. To facilitate the securing of the lid or closure strip 12 angle members such as are indicated at 14, FIGURES 2-4, may be provided at the outer edges of the troughs or channels although of course other appropriate fixing means may readily be employed.

It is envisaged that each trough or channel 11 will accommodate a plurality of layers of prestressing tendons, such as wire which will be wound under tension around the vessel in any convenient manner and it (the trough or channel) will be effective to hold the wire layers properly in place.

While the foregoing envisages the provision of a plurality of relatively narrow troughs or channels it may be desirable to pre-form one or more relatively wide circumferential channels or troughs in the outer surface of the concrete pressure vessel and such a possible construction is illustrated in FIGURE 5. In FIGURE 5 the trough or channel is shown as being completely lined but it may be unlined or partially lined somewhat as indicated in FIGURE 2 or 3. In the case where a wider trough or channel is provided it may be, as indicated in FIGURE 5, divided by means of one or more partition plates 15 into a number of troughs or channels of less width. In general the width of the troughs or channels will be determined by the wire winding and tension apparatus employed and also by design requirements. In FIGURE 5 a single lid or closure strip 16 is shown but in those cases where partitions such as 15 are employed it may be found desirable to provide a separate lid or closure strip in respect of each trough or channel so formed or in respect of two or more of such troughs or channels.

Instead of pre-forming troughs or channels in the outer surface of the pressure vessel itself it may be desirable as indicated in FIGURES 6–8 to position one or more duct units on the outer surface of the vessel thereby to provide one or more troughs or channels which will extend around the vessel and provide accommodation for prestressing wires. Each trough or channel extending around the vessel may be constituted by a single duct unit which extends completely around the vessel or alternatively a plurality of duct units may be disposed in a common horizontal plane to provide the equivalent of a trough or channel which extends around the vessel but which is interrupted or broken at one or more points. As indicated at 17 in FIGURES 6 and 7 each duct unit may be so constructed as to provide the equivalent of a relatively narrow circumferential trough or channel or alternatively as indicated in FIGURE 8 the trough or channel formed may be of relatively large width. In the latter case it may be found desirable to sub-divide the relatively wide trough or channel by means of dividing plates such as indicated at 18 into a plurality of narrower troughs or channels. The duct units will conveniently be made of steel but any other appropriate materials may be employed. While the duct units may be of rectangular or substantially rectangular section as shown they may well be of any other section appropriate for the purpose in view and instead of the construction indicated they could each be formed of two oppositely disposed L shaped sections of steel, precast concrete or other material such sections being so arranged in spaced parallel relationship as to provide the equivalent of a trough or channel, one limb of each such sections being held in place against the walls of the vessel by the first layer of prestressing wires. As in the preceding embodiments described with reference to FIGURES 1–5 the duct units of FIGURES 6–8 will be provided with lids or closure strips 19 capable of sealing the troughs or channels after the prestressing wires have been positioned therein.

It will be appreciated that the provision of troughs or channels in or on a vessel or other structure requiring to be prestressed may be effected in many ways and that the various constructions indicated above are purely exemplary.

However the troughs or channels are formed provision will conveniently be made for the anchoring of prestressing wires at intermediate positions during winding or means may be incorporated whereby such anchoring devices can be attached. The anchoring devices employed may take many forms. For example they may each comprise a clamp adapted to engage and to grip the wire or possibly a fixed block having a slot or channel therein adapted to accommodate the wire the latter having a collar, ferrule or other abutment device affixed thereto which, when the wire is located in the slot, will abut against an end face of the block and prevent endwise movement of the wire in the direction in which a pull is exerted. When such a block is employed the slot may be wedge form and the wire may have a wedge element affixed thereto adapted to engage in such slot. The anchoring devices may be located on one of the walls defining the trough or channel or in recesses or pockets formed in the latter. It may also be desirable to include facilities for the attachment of a continuous chain belt, wire rope or other similar device passing around the circumference of the vessel such a device providing means whereby the wire tensioning device employed may draw itself around the vessel.

In order to facilitate winding of the prestressing wire it may be desirable to equip each trough or channel with one or more horizontal rails or running surfaces which will serve to support and guide a wire winding mechanism. The or each rail or running surfaces may be situated within the trough or channel or it may be constituted by a projection of the lining or duct or appropriately attached to the angle member bordering the trough or channel somewhat as indicated in dotted lines in FIGURE 8. The form of the rails provided will depend on the particular wire winding mechanism employed and such rails may be either of a temporary nature i.e. such that they may be removed after winding has been effected or they may constitute a permanent feature of the structure.

Normally prestressing wires are of circular section and the provision of a channel or trough in or on the outer surface of a pressure vessel or other structure is primarily intended to prevent a band or coil of prestressing wires from collapsing due to the wedging action of each layer on the layers below, or from becoming displaced e.g. by slipping, as a result of the shape of the vessel. The problem arising from the use of round or circular section wire could however be largely avoided if the prestressing wire were of rectangular or substantially rectangular section or of substantially tape-like form. In such a case each layer of wire wound around a vessel would present a flat surface on which the next layer could be wound and there would be little tendency for successive layers to exert any wedging action such as would result in collapse of the band or coil.

By using rectangular section or tape-like wire or tendons the interstices between the wires of a completed band or tendon would be very much smaller than would be the case if round or circular section wires were used and the size of cable for a given prestressing force could therefore be reduced so that a smaller or more concentrated band of prestressing force would result.

It will be appreciated that the inner layer of prestressing wires wound under tension are subjected to transverse loads applied by succeeding layers. With round or circular section wires, each succeeding layer forms a line contact with the layer below and the transverse stresses which thus arise are highly concentrated. With flat or tape like wires the transverse stresses will be spread over a large area and their effect on the strength of the tendon band will therefore be greatly reduced. Because of this it would be possible to use very many more layers of flat or tape like wire without exceeding the acceptable limits of transverse stress.

In general it may be said that flat or tape like wire could be applied in a similar way to round or circular section wire but its use would result is the possibility of even greater concentrations of prestressing force, the use of lighter forms of ducting and the possibility of superimposing a much greater number of layers than is possible with round or circular section wire.

Possibly it may be found to be desirable to interleave the layers of windings with a thin steel or other suitable strip or membrane as, for example, the strip 20 between adjacent layers 21, 22 of the windings shown in FIGURE 5. The presence of such a strip or membrane interposed between each layer of windings would contribute to the prevention of corrosion of the windings and would particularly in the case of round or circular section wire prevent the shape of each layer of windings being dictated by the shape of the underlying winding i.e. each layer of windings would in effect be independent.

Finally the system hereinbefore described provides for effective protection of prestressing wires against corrosion since said wires will be effectively encased and they may additionally be sealed in by cement, bitumen or other appropriate material.

I claim:

1. A pre-stressed concrete pressure vessel construction for housing a nuclear reactor comprising a concrete vessel body having about its periphery a plurality of surrounding continuous channels disposed in axially spaced relationship to each other, each channel being defined by a bottom wall and a pair of side walls, each pair of side walls at the terminal ends thereof defining a mouth of each channel which is of a width at least equal to the width of the associated bottom wall, means lining each channel for rendering the channels impervious to moisture, a plurality of layers of tendons wound within each channel under tension, the innermost layer bearing against the bottom wall and successive outer layers respectively being disposed upon and supported by the next adjacent inner layer, each layer being formed by a single tendon having starting and finishing ends anchored to said side walls, the windings of each layer of tendons being in side-by-side contacting relationship devoid of cross windings of any one tendon within a layer.

2. A pre-stressed concrete pressure vessel construction according to claim 1, in which said tendons are of wire form.

3. A pre-stressed concrete pressure vessel construction according to claim 1 in which said channel is formed in said vessel body.

4. A pre-stressed concrete pressure vessel construction according to claim 3 in which said lining is of a material other than concrete.

5. A pre-stressed concrete pressure vessel construction according to claim 1 in which said channels are separate structures exteriorly of and intimately engaging the walls of said vessel body.

6. A pre-stressed concrete pressure vessel construction according to claim 5 in which said channels are formed of metal.

7. A pre-stressed concrete pressure vessel construction according to claim 1 in which said channels are provided with closure means closing said mouths.

8. A pre-stressed concrete pressure vessel construction according to claim 1 in which is provided rail means on the outside of said vessel construction adjacent said channel for cooperating with mechanism required to travel around said construction for winding said tendons under tension.

9. A pre-stressed concrete pressure vessel construction according to claim 1 in which a thin membrane is positioned between adjacent layers.

10. A pre-stressed concrete pressure vessel construction according to claim 1 wherein a plurality of axially adjacent ones of said channels form a relatively wide trough which is divided into said plurality of channels by partion members.

References Cited

UNITED STATES PATENTS

| 1,189,694 | 7/1916 | Janssen et al. | 52—224 |
| 1,804,888 | 5/1931 | Monsch. | |
| 2,803,868 | 8/1957 | Dobell | 52—224 |
| 2,932,964 | 4/1960 | Dobell | 52—224 |
| 2,953,310 | 9/1960 | McLean | 242—7 |
| 3,278,128 | 10/1966 | Szulc | 242—11 |

FOREIGN PATENTS

| 837,018 | 12/1938 | France. |
| 874,686 | 4/1953 | France. |
| 866,928 | 6/1941 | France. |
| 1,023,440 | 8/1956 | Germany. |
| 485,552 | 10/1953 | Italy. |
| 1,290,306 | 3/1962 | France. |
| 989,663 | 4/1965 | Great Britain. |

HENRY C. SUTHERLAND, *Primary Examiner.*